(12) United States Patent
Benner, Jr.

(10) Patent No.: US 11,232,772 B2
(45) Date of Patent: *Jan. 25, 2022

(54) DEVICE FOR REDUCING VIBRATION IN IMPACT TOOLS AND ASSOCIATED METHODS

(71) Applicant: William R. Benner, Jr., Sorrento, FL (US)

(72) Inventor: William R. Benner, Jr., Sorrento, FL (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/815,311

(22) Filed: Nov. 16, 2017

(65) Prior Publication Data

US 2018/0075828 A1    Mar. 15, 2018

Related U.S. Application Data

(63) Continuation of application No. 15/016,838, filed on Feb. 5, 2016, now Pat. No. 9,852,720.

(51) Int. Cl.
| | | |
|---|---|---|
| *G10D 13/12* | (2020.01) | |
| *F16F 7/01* | (2006.01) | |
| *G10D 13/02* | (2020.01) | |
| *G10D 13/14* | (2020.01) | |

(52) U.S. Cl.
CPC .............. *G10D 13/12* (2020.02); *F16F 7/01* (2013.01); *F16F 7/015* (2013.01); *G10D 13/02* (2013.01); *G10D 13/14* (2020.02)

(58) Field of Classification Search
CPC .... G10D 13/003; G10D 13/022; G10D 13/12; G10D 13/02; G10D 13/14; G10D 13/10; G10D 13/01; F16F 7/01; F16F 7/015
See application file for complete search history.

(56) References Cited

U.S. PATENT DOCUMENTS

| | | |
|---|---|---|
| 2,521,336 A | 9/1950 | Bramson |
| 3,137,194 A | 6/1964 | Simpson |
| 3,585,897 A | 6/1971 | Staleup |
| 3,608,419 A | 9/1971 | Russell |
| 3,722,350 A | 3/1973 | Cordes |
| 3,866,508 A | 2/1975 | Huslig |
| 3,893,364 A | 7/1975 | Harrison |
| 3,958,485 A | 5/1976 | Peters |
| 3,998,123 A | 12/1976 | Hinger |
| 4,039,012 A * | 8/1977 | Cook ............... B25D 1/02 473/333 |
| 4,040,323 A | 8/1977 | Kline |
| 4,047,460 A | 9/1977 | Fiedler et al. |
| 4,114,503 A | 9/1978 | Petillo |
| 4,202,241 A | 5/1980 | Lucas |
| 4,246,826 A | 1/1981 | Warrick et al. |
| 4,300,438 A | 11/1981 | Handal |

(Continued)

FOREIGN PATENT DOCUMENTS

CN        106626587 A * 5/2017 ............... B32B 9/00

*Primary Examiner* — Kimberly R Lockett
(74) *Attorney, Agent, or Firm* — Stephen G. Anderson; Greenberg Traurig, P.A.

(57) ABSTRACT

Disclosed are devices and methods for reducing resonant vibrations in impact tools. The embodiments disclosed herein include the use of certain particles positioned within an impact tool, such as a hammer, for converting the energy of vibration to heat energy resulting from collisions between the particles.

17 Claims, 9 Drawing Sheets

(56) References Cited

U.S. PATENT DOCUMENTS

| | | | |
|---|---|---|---|
| 4,320,688 A | 3/1982 | Donohoe | |
| 4,385,544 A | 5/1983 | Heiskell | |
| 4,462,296 A | 7/1984 | Heiskell | |
| 4,476,768 A | 10/1984 | Willis | |
| 4,488,470 A | 12/1984 | Larrain | |
| 4,535,671 A | 8/1985 | Stromberg et al. | |
| 4,702,143 A | 10/1987 | Brochstein | |
| 4,719,836 A | 1/1988 | Baumgart | |
| 4,763,557 A | 8/1988 | Donohoe | |
| 4,905,566 A | 3/1990 | Hughlett et al. | |
| 5,044,250 A * | 9/1991 | Beyer | G10D 13/003 84/422.4 |
| 5,179,237 A | 1/1993 | Grossman | |
| 5,203,561 A * | 4/1993 | Lanctot | A63B 60/24 473/282 |
| 5,218,152 A | 6/1993 | Campbell et al. | |
| 5,263,395 A | 11/1993 | Phillips | |
| 5,265,514 A | 11/1993 | Schertz | |
| 5,341,716 A | 8/1994 | Donohoe | |
| 5,362,046 A | 11/1994 | Sims | |
| 5,447,088 A * | 9/1995 | Mester | G10D 13/003 84/422.4 |
| 5,503,056 A | 4/1996 | Evans | |
| 5,581,031 A | 12/1996 | Blankenship | |
| 5,602,355 A | 2/1997 | Lipp | |
| 5,659,143 A * | 8/1997 | Isackson | G10D 13/06 446/419 |
| 5,696,339 A | 12/1997 | Brennan | |
| 5,929,356 A | 7/1999 | Piland et al. | |
| 6,028,260 A | 2/2000 | LaLonde | |
| 6,028,261 A | 2/2000 | Johnson | |
| 6,069,308 A | 5/2000 | Rabb | |
| 6,118,062 A | 9/2000 | Thoman | |
| 6,271,451 B1 | 8/2001 | Gress | |
| 6,302,813 B1 * | 10/2001 | Sturgeon | G10K 3/00 473/564 |
| 6,307,138 B1 | 10/2001 | Simpson | |
| 6,310,278 B1 | 10/2001 | Butler | |
| 6,326,535 B1 | 12/2001 | Pokallus | |
| 6,353,166 B1 | 3/2002 | Signor | |
| 6,365,813 B1 | 4/2002 | Gress | |
| 6,423,890 B2 | 7/2002 | Zbrzezny et al. | |
| 6,653,541 B1 | 11/2003 | Minker | |
| 6,759,583 B2 | 7/2004 | Mizuno et al. | |
| 7,084,339 B2 | 8/2006 | Rundle | |
| 7,176,369 B1 | 2/2007 | Brooks | |
| 7,375,271 B1 | 5/2008 | Zelinsky | |
| 7,427,706 B1 | 9/2008 | Wilhelm | |
| 7,439,435 B1 | 10/2008 | Jendrisak | |
| 7,538,264 B1 | 5/2009 | Turos | |
| 7,557,286 B2 | 7/2009 | Capotosto | |
| 7,595,442 B2 | 9/2009 | Grover | |
| 7,626,108 B1 | 12/2009 | Takegawa | |
| 7,741,552 B2 | 6/2010 | Walker | |
| 7,855,332 B1 | 12/2010 | Turos | |
| 7,868,237 B1 | 1/2011 | Quilon | |
| 7,897,859 B2 | 3/2011 | Ruttenberg | |
| 7,906,719 B2 | 3/2011 | Seymour | |
| 7,960,635 B2 | 6/2011 | Rice | |
| 8,163,989 B2 | 4/2012 | Richard | |
| 8,253,003 B2 | 8/2012 | Ruttenberg | |
| 8,618,397 B2 | 12/2013 | Ruttenberg | |
| 8,674,204 B2 | 3/2014 | Rundle | |
| 8,748,722 B2 | 6/2014 | Ruttenberg | |
| 8,977,515 B2 | 3/2015 | Hughlett | |
| 8,981,194 B2 | 3/2015 | Grossman | |
| 8,987,569 B2 | 3/2015 | Huber | |
| 9,318,083 B2 * | 4/2016 | Cacciolo, Jr. | G10D 13/003 |
| 2002/0002895 A1 | 1/2002 | Zbrzezny et al. | |
| 2004/0220000 A1 | 11/2004 | Falone et al. | |
| 2004/0231493 A1 | 11/2004 | Milne et al. | |
| 2006/0027073 A1 | 2/2006 | Richard | |
| 2006/0107818 A1 | 5/2006 | Judd | |
| 2006/0174753 A1 * | 8/2006 | Aisenbrey | G10H 1/32 84/600 |
| 2008/0014835 A1 | 1/2008 | Weston et al. | |
| 2008/0168890 A1 | 7/2008 | Judd | |
| 2008/0250911 A1 | 10/2008 | Heselton | |
| 2011/0067554 A1 * | 3/2011 | Taninbaum | G10D 13/003 84/422.4 |
| 2011/0247477 A1 | 10/2011 | Chang | |
| 2012/0144975 A1 * | 6/2012 | Destocki | G10D 13/003 84/402 |
| 2013/0267358 A1 * | 10/2013 | Vaccaro, Jr. | A63B 60/10 473/566 |
| 2013/0298749 A1 | 11/2013 | Richards | |
| 2014/0311320 A1 * | 10/2014 | Grossman | B27L 9/00 84/422.4 |
| 2014/0323251 A1 * | 10/2014 | Estrada | A62B 99/00 473/564 |

* cited by examiner

| TABLE OF MATERIALS AND APPROXIMATE DENSITIES ||
|---|---|
| MATERIAL | DENSITY (g/cm$^3$) |
| GLASS MICRO-SPHERES | 0.15 |
| HICKORY | 0.83 |
| SAND | 1.6 |
| COPPER | 8.92 |
| BISMUTH | 9.78 |
| MOLYBDENUM | 10.28 |
| LEAD | 11.34 |
| TUNGSTEN CARBIDE | 15.63 |
| TUNGSTEN | 19.25 |

FIG. 7

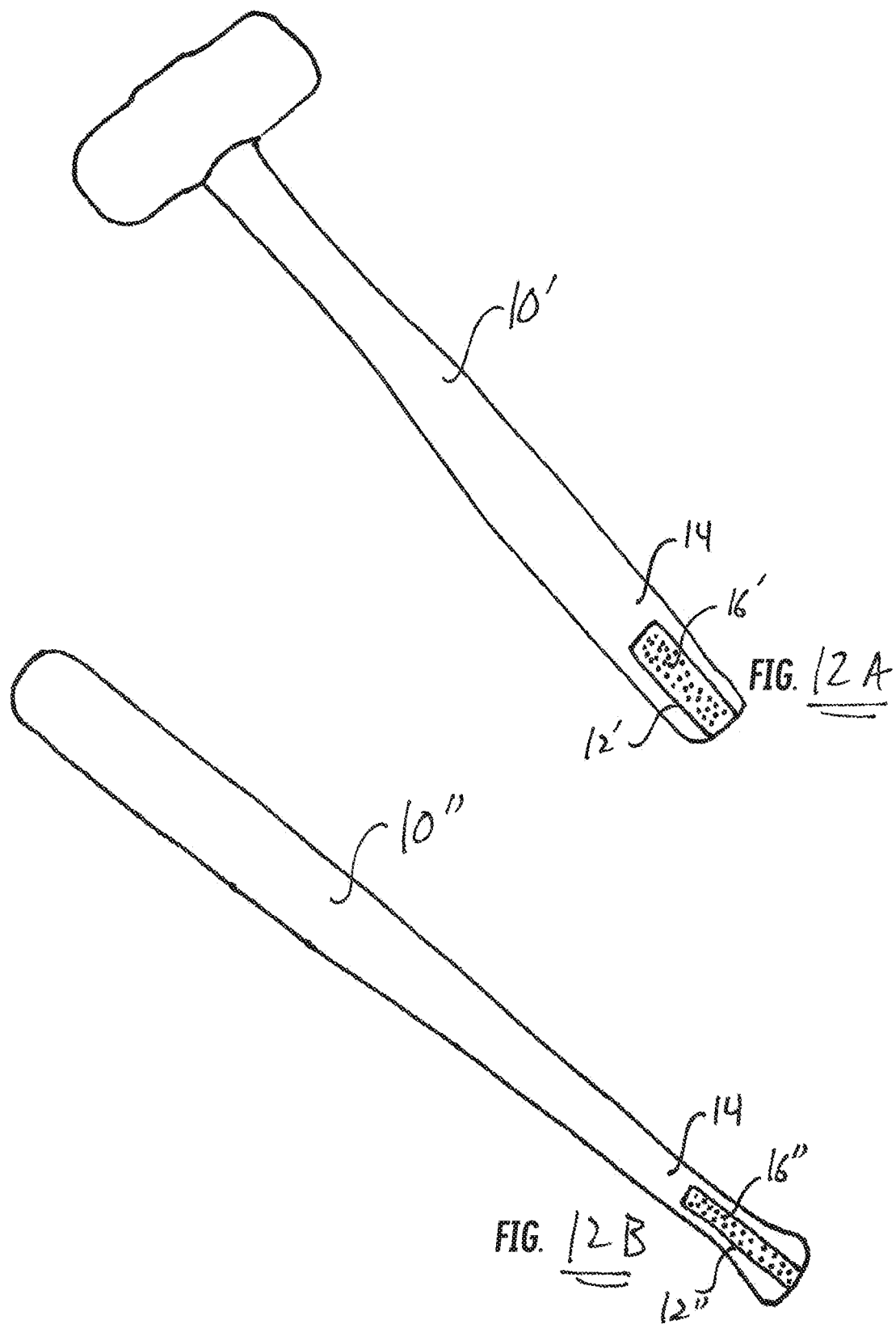

DEVICE FOR REDUCING VIBRATION IN IMPACT TOOLS AND ASSOCIATED METHODS

CROSS REFERENCE TO RELATED APPLICATIONS

This application is a continuation of, and claims priority to, U.S. patent application Ser. No. 15/016,838, filed Feb. 5, 2016, the contents of which are hereby incorporated by reference and commonly owned.

FIELD OF INVENTION

The embodiments disclosed herein relate to a technique, device, and associated methods for reducing undesirable shock or vibration in impact tools and certain percussive implements when striking a surface. More particularly, the exemplary embodiments relate to an improved vibration-resistant drumstick for striking percussive instruments, such as, for example, acoustic drums, electronic drums, cymbals, cow bells and the like. The embodiments disclosed herein are also useful for controlling the shock and vibration in other impact tools, such as hammers or baseball bats.

BACKGROUND

Modern day drumsticks are most commonly made of wood. The most popular type of wood is hickory, because it is both hard and strong. Other woods commonly used for drumsticks include oak, maple, walnut and bamboo. An example of a typical present day drumstick is depicted in FIG. 1.

When a drummer plays using drumsticks, he or she does not typically hold the drum stick firmly. Instead, the drumstick is held somewhat loosely between fingers, allowing the stick to rebound off of percussive surfaces when struck. Because of this loose grip on the drumstick, any tendency for the stick to resonate after striking a surface is not damped by a drummer's hand. Instead, the drumstick is free to vibrate just as it would unsuspended, in open air.

Drumstick vibration and resonance is particularly apparent when the drumstick strikes a very hard surface, such as a cymbal or a drum rim. This is because wood materials commonly used for drumsticks have a very high quality factor of resonance, or "Q factor," which causes a drumstick to continue to vibrate after it strikes a hard surface. If the drumstick is constantly vibrating in the drummer's hands, or even periodically vibrating, this may cause fatigue while playing. Indeed, some drummers report tingling in the hands and fingers during and after drumming. In extreme cases, the resonant vibrations occurring in a drumstick could lead to tendonitis and/or other undesirable problems. Nevertheless, it is the drummer's intention to strike the surface of a drum or cymbal to produce sound from the drum or cymbal, while it is not the drummer's intention to excite resonances in the drumstick. Therefore, the tendency for a drumstick to vibrate after striking a surface is undesirable.

Several techniques have been employed in the art over the years to combat the problem of drumstick vibration and associated fatigue. These techniques, however, have yielded less than desirable results. For example, several drumsticks have been developed having a shape that differs from the classic tapered design. An example of one such drumstick is shown in FIG. 2. Other vibration-reducing techniques include placing a rubber ring around the butt-end of a drumstick, as described in US Patent publication 20060107818, or placing a rubber insert into the butt-end of a drumstick, as can be found with Zildjian®'s "Anti-Vibe" drumsticks.

Another technique for reducing resonant vibrations includes forming the drumstick out of a material other than wood. Some alternative drumstick materials include nylon and carbon fiber, although the most common carbon fiber drumsticks consist of chopped carbon fiber in a nylon matrix. Nylon drumsticks, however, typically have very low stiffness. Thus, while the resonant frequencies are lower than a typical wooden drumstick, nylon drumsticks are also unpleasantly flexible. Drummers typically appreciate the feel of wooden sticks, so nylon is not necessarily a good alternative. Carbon fiber sticks have a similar weight and feel when compared to wooden sticks, but undesirable resonance vibration still occurs. Thus, carbon fiber sticks do not appear to be a complete solution to reducing undesirable resonant vibrations.

Therefore, there remains a need in the art for a technique, device, and/or method for largely or completely eliminating resonance vibrations that occur when a drumstick or other impact tool strikes a surface.

SUMMARY

The embodiments disclosed herein advantageously overcome the problems with prior-art drum sticks and anti-vibration techniques by largely or completely eliminating vibration and resonances. The invention may be embodied in several ways, including as an integral part of the drumstick, or alternatively as a device that is either inserted into a drumstick or attached to the exterior of a drumstick.

One embodiment includes a vibration-resistant instrument (e.g. a tool such as a drumstick, a hammer, or a bat) comprising a body portion having opposing first and second ends, the first end operable for striking a surface and the second end operable for being held by a user (e.g., a handle). Disposed within the instrument or tool is a plurality of particles, or beads, proximate at least one of the first and second ends.

Another embodiment includes a module or device for reducing vibration in an impact tool, the module comprising a container portion defining a hollow cavity for receiving particles, such as beads, and an attachment portion operable with the container portion for attaching the module to the impact tool.

Yet another embodiment includes a method for reducing vibration in an impact tool or instrument, the method comprising procuring a module for reducing vibration in an impact tool, the module including particles, such as beads, the module including an attachment portion in coordination therewith, and attaching the module to the impact tool via the attachment portion.

BRIEF DESCRIPTION OF THE DRAWINGS

Embodiments of the invention are described by way of example with reference to the accompanying drawings in which:

FIG. 7 is a table of relevant materials and associated densities;

FIG. 12A is a perspective view of an alternative embodiment comprising a hammer configured in accordance with the principles of the present disclosure.

FIG. 12B is a perspective view of another alternative embodiment comprising a bat configured in accordance with the principles of the present disclosure.

DETAILED DESCRIPTION OF EMBODIMENTS

The embodiments will now be described more fully hereinafter with reference to FIGS. 1-12B, in which embodiments are shown by way of illustration and example. The invention may, however, be embodied in many forms and should not be construed as limited to the embodiments set forth herein. Rather, these embodiments are provided so that this disclosure will be thorough and complete, and will fully convey the scope of the invention to those skilled in the art. The embodiments and examples described herein relate to the reduction of vibration in certain drumsticks. However, it is apparent that the devices, methods, and other techniques may be used to measure and subsequently reduce vibration in other impact tools, implements, devices, and instruments. Like numerals refer to like elements.

Figure 1:
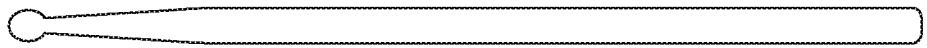
FIG. 1 is a side view of a typical prior art drumstick.
Figure 2:
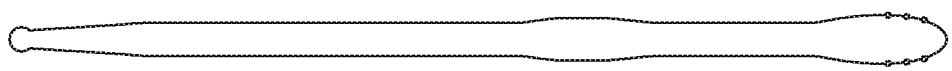
FIG. 2 is a side view of another prior art drumstick.
Figure 3:
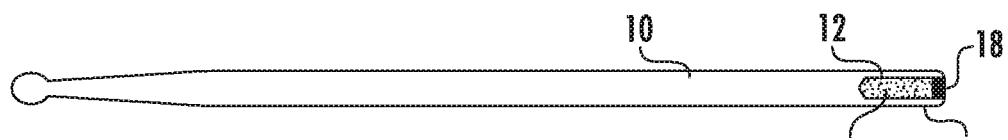
FIG. 3 is a side view of a first embodiment of the present disclosure.

With reference initially to FIG. 3, one embodiment includes a drumstick 10 defining a hollow cavity 12 in the butt-end of its handle 14. Embodiments comprising a hammer (FIG. 12A) or a bat (FIG. 12B) having a handle 14 are also disclosed. The cavity 12 is filled with particles 16, such as beads. The particles 16 are preferably made from material having a higher density than the bulk drumstick material. In some embodiments, the particles occupy a volume less than a volume of the hollow cavity, wherein the particles are capable of movement in the hollow cavity. A cap 18 is then placed on the butt-end of the handle 14 of the drumstick 10, thereby preventing the particles 16 from escaping.

In the embodiments depicted in FIGS. 3, 12A, and 12B, the particles 16, 16', 16" do not completely fill the cavity 12, 12' 12" and some amount of space (e.g. "air space") is left unfilled. This allows the particles to move around and flow somewhat freely within the cavity 12, 12', 12". As an alternative to leaving an empty space, the space left unoccupied by the particles 16, 16', 16" may comprise a soft material that keeps the particles somewhat compacted, yet still permits the particles to move and collide with one another when the drumstick 10, hammer 10', or bat 10" strikes a surface. The soft material could be an elastomer such as rubber or silicone. Other suitable materials, however, are considered within the scope of the present disclosure.

When the drumstick 10 strikes the playing surface it creates shock, which excites vibration at the resonances within the drumstick 10. The kinetic energy of the initial shock and subsequent vibration is conveyed to the particles 16, which then move around within the cavity 12 in the drumstick 10. The particles 16 collide with one another, creating friction between themselves. This friction creates heat (although only a tiny amount of heat that is imperceptible to the drummer). Because of the laws of physics related to conservation of energy, when heat is generated due to the friction of the moving particles, the energy to create the heat removes energy from the vibration. Thus, the collisions of the particles, and the resulting friction, effectively adds damping to the system.

In one exemplary embodiment, the particles 16 reside at a location within the drumstick 10 that is in motion during the vibrations/resonances that occur after striking a surface. Thus, in one embodiment, the particles 16 reside at the butt-end of the stick. In another embodiment, the particles 16 reside in an intermediate portion of the drumstick 10 (not shown). In yet another embodiment, the particles 16 reside at the tip-end of the drumstick 10 (not shown).

Figure 4A:
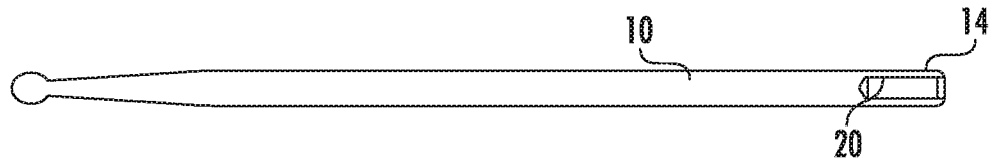
FIG. 4A is a side view of a second embodiment of the present disclosure.
Figure 4B:
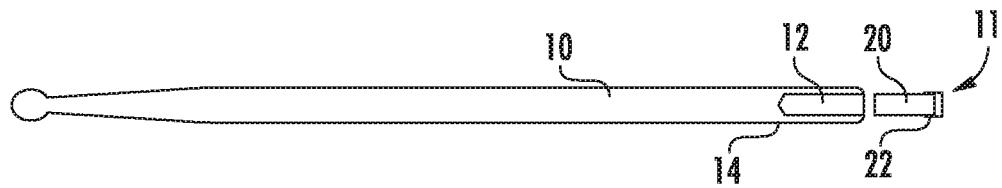
FIG. 4B is an exploded view of the embodiment depicted in FIG. 4A.
Figure 4C:
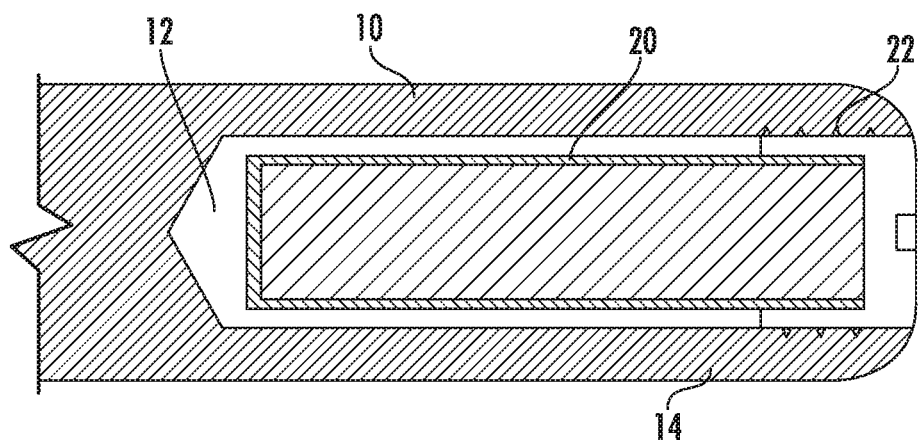
FIG. 4C is an enlarged side view of the embodiment depicted in FIG. 4A.

FIGS. 4A-4C depict another embodiment of the present disclosure. In this embodiment, the particles 16 are disposed in a device 11 having a container, or cell 20. The cell 20 may be made of a low-density material such as, for example, plastic, aluminum, or other suitable material. The device 11 is intended to be placed into a cavity 12 defined by the butt-end 14 of a drumstick 10 or other impact tool, and therefore the device 11 may further comprise threaded screw-like features 22 for securing the device 11 to the drumstick 10. This embodiment allows the device to be used on a variety of drumsticks, not just drumsticks that are manufactured with the particles inside. To take advantage of this embodiment, one only needs to drill a hole into the butt-end of a pre-existing drumstick having a diameter and depth sufficient for inserting and securing the device 11 inside the drumstick 10. When the drumstick 10 strikes a percussive instrument, the shock and vibration impinged on the drumstick 10 is conveyed to the cell 20 having particles 16 inside. The particles 16 react in substantially the same way as described above, colliding with one another to damp resonant vibrations in the drumstick.

Figure 5A:
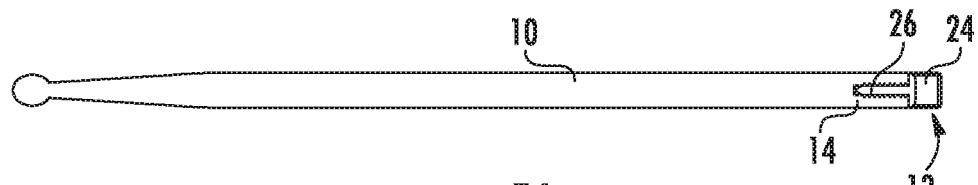
FIG. 5A is a side view of a third embodiment of the present disclosure.
Figure 5B:
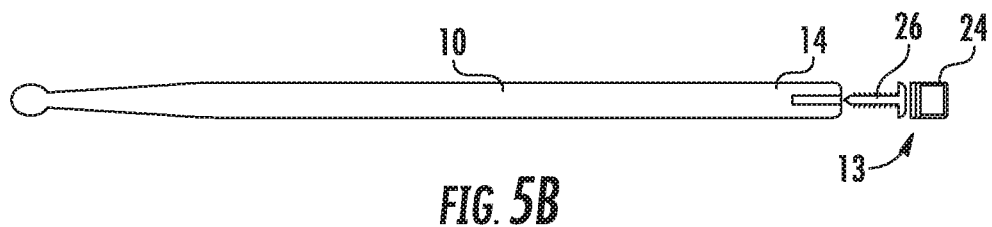
FIG. 5B is an exploded view of the embodiment depicted in FIG. 5A.

FIGS. 5A-5B show an alternative embodiment of the present disclosure. In this embodiment, the particles 16 are disposed in a device 13 having a cell 24, as described in the embodiment of FIGS. 4A-4C. However, unlike the embodiment described in FIGS. 4A-4C, this embodiment is configured to reside external to the drumstick 10. Thus, in one exemplary embodiment, the diameter of the cell 24 is larger than embodiments residing internal to the drumstick, desirably having a diameter close to that of the drumstick on which it will be used, and the depth of the cell 24 is shorter to avoid over-lengthening the drumstick. Basically the cell 24 is sized to capture the intended total mass of particles 16, while not being overly large so as to become intrusive to the drummer. One benefit of this embodiment is that it may be attached to the drumstick 10 via a small screw 26, adhesive, or some other securing means. Like the embodiment of FIGS. 4A-4C, this embodiment may be used on a variety of pre-existing drumsticks. Thus, it is possible for a drummer to modify their favorite drumstick and add shock and vibration cancellation with relative ease.

Figure 6A:
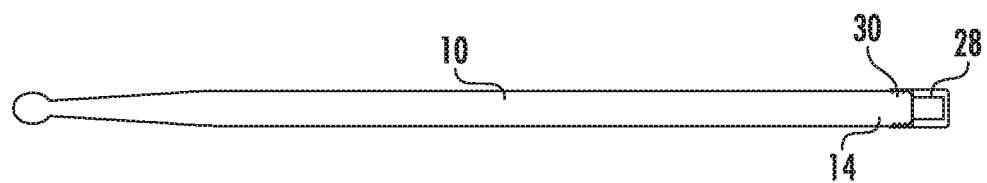
FIG. 6A is a side view of a fourth embodiment of the present disclosure.
Figure 6B:
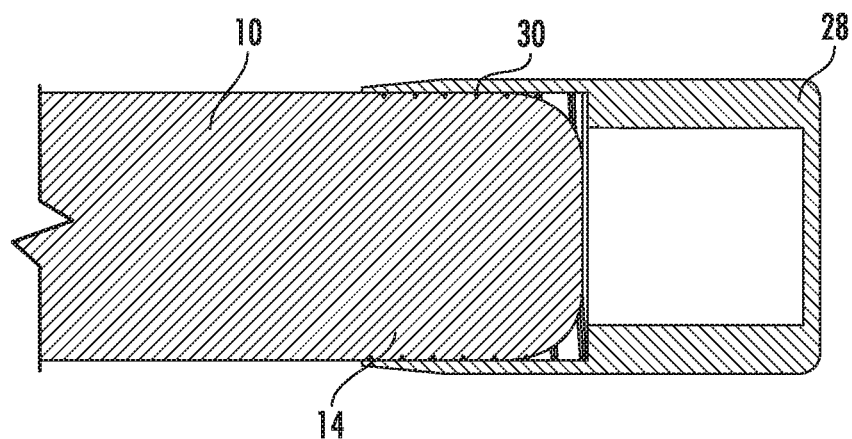
FIG. 6B is an enlarged side view of the embodiment depicted in FIG. 6A.

FIGS. 6A-6B depict yet another alternative embodiment of the present disclosure, comprising a device 28 defining a cell for housing particles, the cell 28 coordinated with a threaded portion 30 for engaging a drumstick 10. In this embodiment, the threaded portion 30 of the device 28 engages the surface of the drumstick 10, thereby enabling a user to attach the device to the drumstick without having to drill a cavity into the butt-end of the stick.

In one exemplary embodiment, for adequate damping to occur, the mechanical impedance of the particles may be matched to the mechanical impedance of the vibrating drumstick. This requires a certain mass ratio. We have found that in order to greatly reduce, and nearly completely eliminate, drumstick vibration after striking a surface, the particles placed into or on the butt-end of the drumstick should have a mass of about $\frac{1}{10}$ the mass of the drumstick itself. Thus, for a typical drumstick having a mass of 50 grams, it takes about 5 grams of particles located in the butt-end of the stick to almost completely eliminate undesirable vibration. Of course, a different particle mass ratio could be used if a different level of damping is desired.

Because the particles used in a typical 50 gram drumstick ideally have a mass of about 5 grams to almost completely damp the resonant vibrations, there is a motivation to use particles having the highest practical density. Particles with lower density require a larger diameter and/or deeper hole to be drilled into the butt-end of the drumstick, or larger cavity in the device. Particles having a density less than or comparable to that of the wood from which the drumstick is formed may have less than desirable results. Moreover, holes in a drumstick or other impact tool having a large diameter or depth may compromise the structural integrity of the stick. This is especially important because some drummers turn the stick around to use the butt-end of the stick during performance.

Exemplary candidates for the particles include metals such as copper, bismuth, molybdenum, lead, tungsten, and tungsten carbide, all of which are available in granular form. The shape and size of the particles may also impact the effectiveness of the embodiments disclosed herein. If the particles are too small (i.e. powder-like), they may become clumped together, impeding the ability of all of the particles to move around and experience friction during vibration and resonances. If the particles have a lot of uneven surfaces, they may become locked together. Therefore, in one exemplary embodiment, the particles have a convex polyhedral surface. Other particle shapes and sizes, however, are considered within the scope of the present disclosure. In one exemplary embodiment, we have found particles having a size of approximately 100 to 800 microns works well for this invention, but this is not intended to be a limitation. In another embodiment, we have found mesh 20 copper powder to effectively reduce undesirable resonant vibrations.

Although not typically known as a high-density material, another candidate for the particles is sand. Sand having a substantially round profile and having a desirable particle size is readily attainable. However, sand has lower density than the metals identified above, which means that the hole diameter and/or hole depth (or cavity size) must be increased to achieve the overall required total mass of the particles.

FIG. 7 depicts a table of exemplary materials and associated densities. Note that this table shows the density of the materials themselves. The "apparent density" of these same materials will be lower once the material is formed into particles, because the particle shapes will allow air to exist in between particles. Because of this, surprisingly we have found powdered tungsten to have a lower "apparent density" than lead. Therefore the material density itself can only be used as a guideline, and not a definitive indicator of the amount of space needed to accomplish a given mass of the particles.

Regardless of the size and shape of the particles, if the material chosen for the particles is a metal, there may be a risk of clumping due to micro-welding during the friction events that occur during strikes. To prevent micro-welding, the particles may be coated with an oxide layer, or alternatively a secondary material may be mixed with the particles to prevent micro-welding. This secondary material ideally does not interfere with the friction/heat resulting from particle collisions, and thus the secondary material is preferably not a lubricant. If an oxide layer on the particles is not practical, a good candidate for the secondary material is talc.

EXAMPLES

Measurements were performed to identify the resonant frequencies that occur in a typical prior-art drumstick after it strikes a surface. This data was verified using Finite Element Analysis (FEA) computer models, which also revealed the "null points" of the resonances (i.e. locations on a drumstick where minimal resonant vibrations occur). Specifically, we measured resonant frequencies and times by attaching a small accelerometer to the butt-end of certain drumsticks and striking a hard playing surface. The accelerometer has a mass that is far less than that of a typical 50 gram drumstick, and is therefore able to observe drumstick motion and vibration without significantly influencing the resonant vibration of the associated drumstick.

Figure 11A:
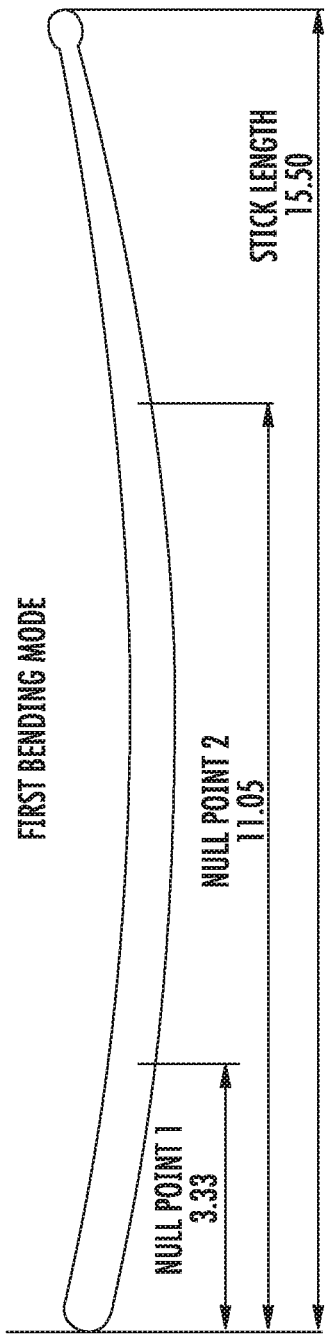
FIG. 11A is a depiction of the bending mode shape and null points at a first resonance mode of a typical unmodified drumstick.
Figure 11B:
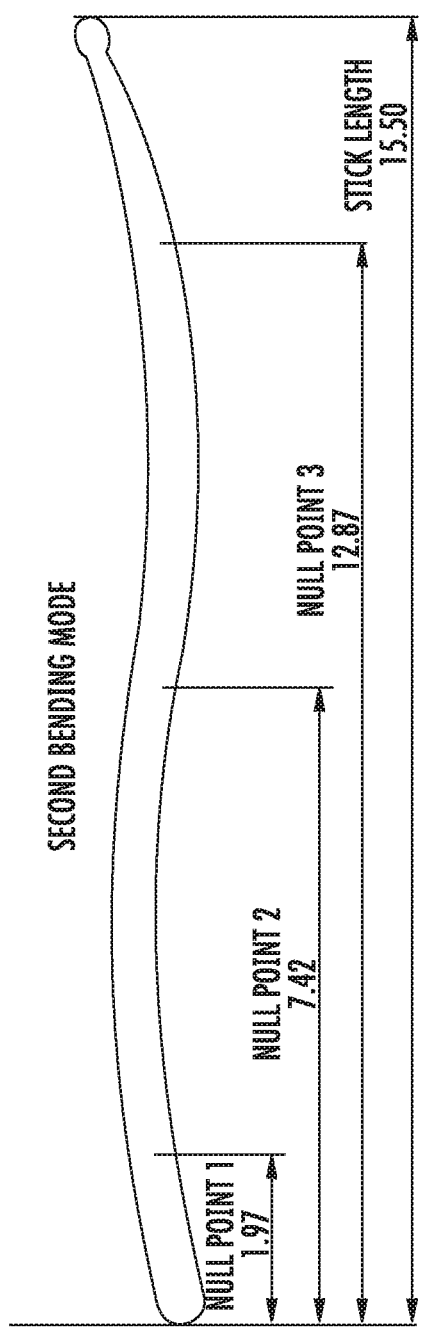
FIG. 11B is a depiction of the bending mode shape and null points at a second resonance mode of a typical unmodified drumstick.

Utilizing the direct measurements and FEA techniques, we discovered that the first two bending-mode resonances in a standard unmodified drumstick occur at about 400 Hz and about 1200 Hz, respectively. Moreover, it was determined that a null-point of the first bending mode resonance is positioned approximately where most drummers typically hold a drumstick. Likewise, a null point for the second bending-mode resonance is not too far away, located a bit closer to the butt-end of the drumstick. The bending modes and null points of a typical unmodified drumstick are depicted in FIGS. 11A and 11B. Because of the position of these null points, a drummer's grip around the drumstick will not have much of an impact on damping drumstick vibrations. Accordingly, in one exemplary non-limiting embodiment, the particles of the present disclosure may be placed in association with a drumstick at a position or location other than that which defines a resonance "null point," thereby potentially maximizing the vibration-reducing effects of the particles.

We also found that vibration of an unmodified commercially available drumstick typically lasts anywhere from between about 200 milliseconds to about 250 milliseconds after striking a surface. Today's popular dance music is often performed at 120 beats per minute or faster. Thus, for a drummer striking the hi-hat cymbal twice per beat, the drum stick is almost constantly vibrating in the drummer's hand.

Unmodified Commercially Available Drumstick

Figure 8:
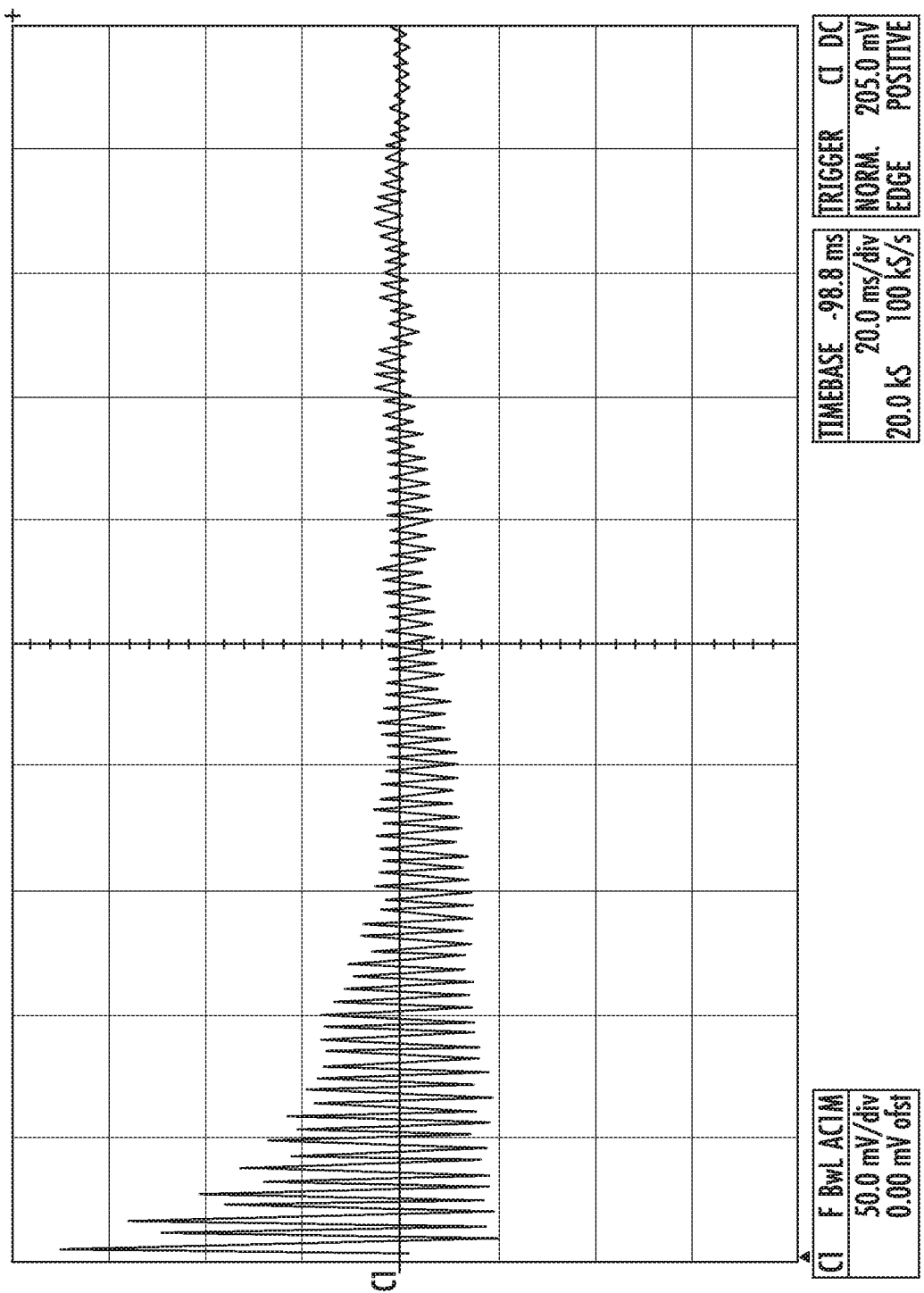
FIG. 8 is an oscilloscope screenshot showing the resonant vibrations in a typical drumstick.

The resonant vibrations that occur in a standard unmodified drumstick after striking a surface are depicted in FIG. 8, which includes an oscilloscope screenshot scaled at 20 ms/div. Vibrational losses contributed by the drumstick material and by the drummer's hand cause the amplitude of the vibration to decrease over time. The observed resonance is due to the cyclic oscillations of converting potential energy (the spring and mass of the drumstick) into kinetic energy (motion during the resonance action) and back to potential energy over and over again.

Commercially Available Reduced-Vibration Drumstick

Figure 9:
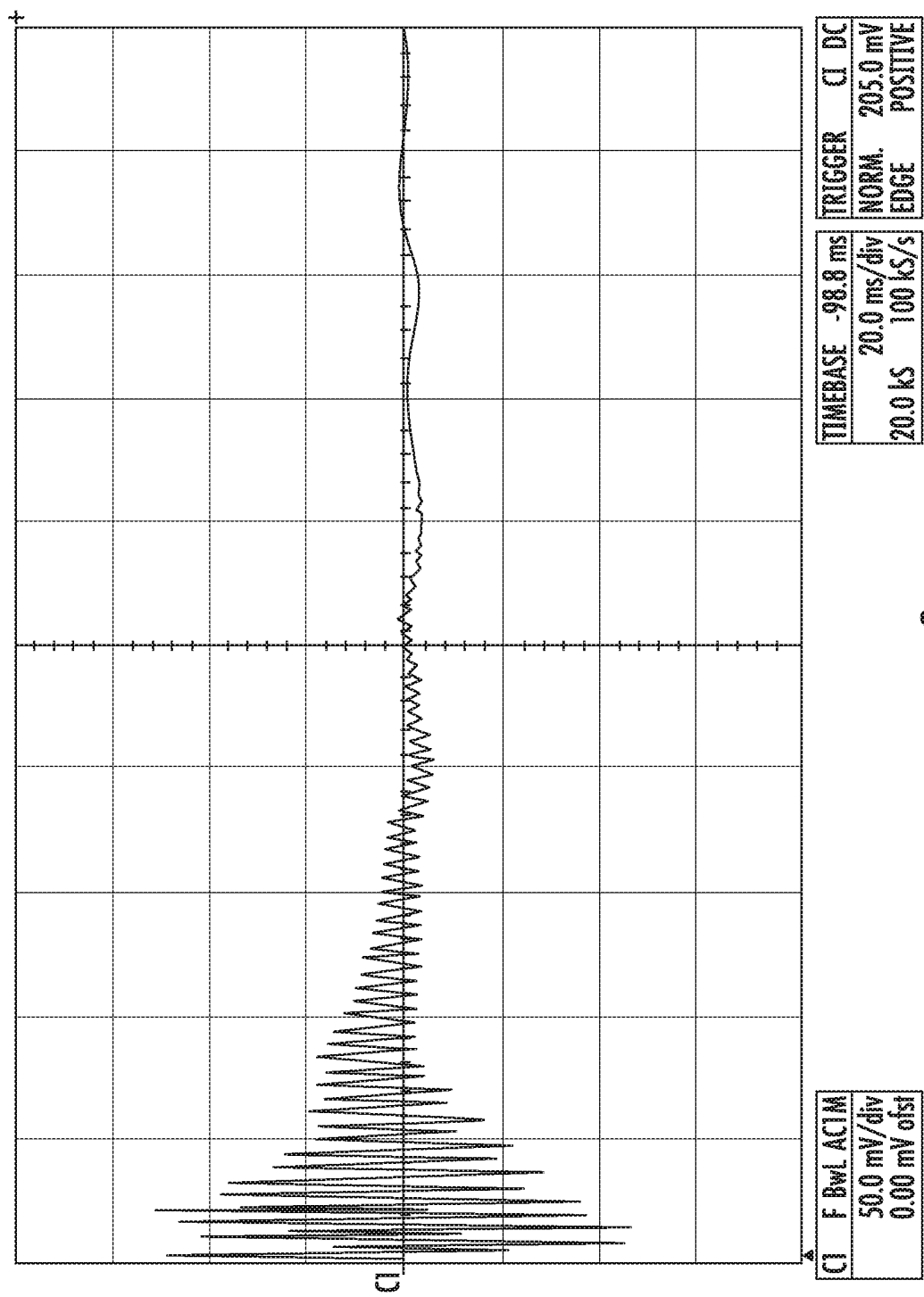
FIG. 9 is an oscilloscope screenshot showing the resonant vibrations in a commercially available Zildjian® "Anti-Vibe" drumstick.

As depicted in FIG. 9, our testing of a Zildjian® "Anti-Vibe" drumstick shows a reduction in resonant vibration compared to that of an unmodified drumstick. Whereas a typical hickory drumstick will vibrate for around 200 milliseconds after it strikes a playing surface, the anti-vibe drumstick will only vibrate for around 100 milliseconds after it strikes a playing surface. However, for those drummers sensitive to vibration, the anti-vibe drumsticks may not be a complete solution.

Embodiment of the Present Disclosure

Figure 10:
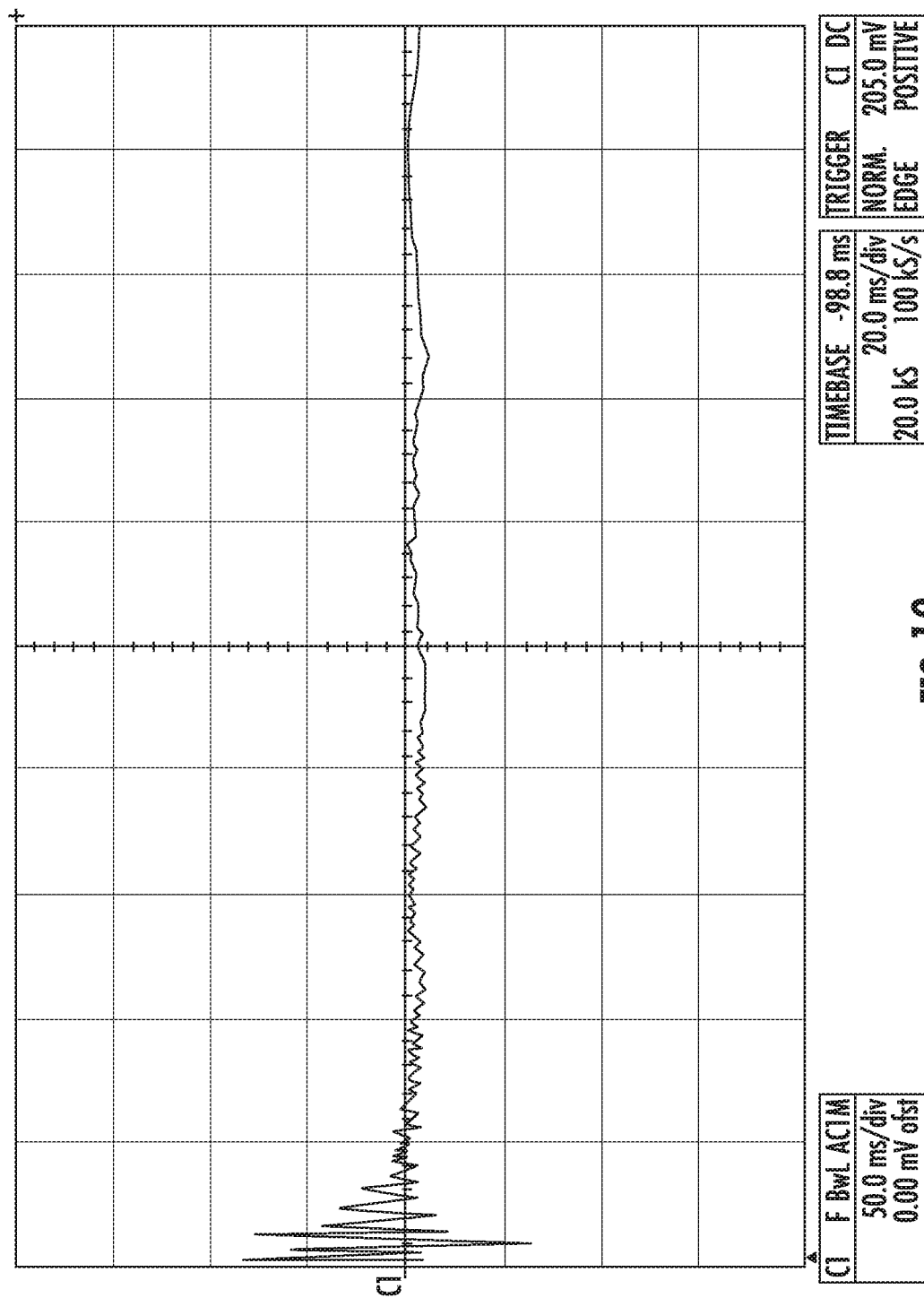
FIG. 10 is an oscilloscope screenshot showing the resonant vibrations in a drumstick modified with an embodiment of the present disclosure.

As shown in the oscilloscope screenshot in FIG. 10, a 50-gram hickory drumstick treated with an embodiment of the present disclosure having 5 grams of particle material in the butt end of the drumstick leads to a near complete damping of vibration. Indeed vibration in a drumstick modified with an embodiment described herein lasts less than 20 milliseconds. It is apparent that the embodiments disclosed herein greatly reduce resonant vibrations as compared to known devices.

Having now described certain embodiments, the construction, the operation and use of preferred embodiments thereof, and the advantageous new and useful results obtained thereby, the new and useful constructions, and reasonable mechanical equivalents thereof obvious to those skilled in the art, are set forth in the appended claims.

That which is claimed is:

1. A vibration-resistant tool comprising:
a handle having a cavity formed therein; and
particles carried within the cavity, the particles comprising a material having a density greater than the density of the handle, wherein the particles have a total mass equal to about one-tenth the total mass of the tool.

2. The tool as described in claim 1, wherein the tool is selected from the group consisting of a hammer and a bat.

3. The tool as described in claim 1, further comprising a container configured for housing the particles within the cavity.

4. The tool as described in claim 3, wherein the container is configured for being removed from the tool.

5. The tool as described in claim 3, wherein at least a portion of the container is carried on the surface of the tool.

6. The tool as described in claim 1, wherein the particles comprise at least one of sand, copper, bismuth, molybdenum, lead, tungsten carbide, and tungsten.

7. A module for reducing vibration in an impact tool, the module comprising:
a container portion defining a hollow cavity;
a threaded attachment portion operable with the container portion and configured for at least one of (1) attaching the module to an end of the impact tool configured for being held by a user and (2) securing the module within an end of the impact tool configured for being held by a user; and
particles carried within the hollow cavity, the particles formed from a material having a density greater than the density of the end of the impact tool configured for being held by a user.

8. The module of claim 7, the particles occupying a volume less than a volume of the hollow cavity, wherein the particles are capable of movement within the hollow cavity.

9. The module as described in claim 8, the particles comprising beads formed from at least one of sand, copper, bismuth, molybdenum, lead, tungsten carbide, and tungsten.

10. The module as described in claim 9, the particles comprising about 99% mesh 20 copper powder.

11. The module as described in claim 7, the impact tool selected from the group consisting of a hammer and a bat.

12. The module as described in claim 7, the particles comprising a material having a total mass equal to about one-tenth the total mass of the impact tool.

13. The module as described in claim 7, wherein the threaded attachment portion comprises a series of threads configured for engaging an interior portion of the impact tool.

14. The module as described in claim 7, wherein the threaded attachment portion comprises a series of threads configured for engaging an exterior portion of the impact tool.

15. A module comprising:
a body portion defining a cavity;
a threaded attachment portion operable with the body portion and configured for attaching the module to an end of an impact tool configured for being held by a user; and
particles carried within the cavity, the particles formed from a material having a density greater than the density of the end of the impact tool configured for bring held by a user,
wherein attaching the module to the impact tool reduces vibration of the impact tool upon striking a surface.

16. The module of claim 15, the particles having a mass equal to about one-tenth the mass of the impact tool.

17. A vibration-resistant tool comprising:
a body portion having opposing first and second ends, the first end configured for striking a surface and the second end configured for being held by a user, the second end defining a cavity;
particles carried within the cavity, the particles having a total mass equal to about one-tenth the total mass of the tool; and
a container configured for housing the particles within the cavity, the container configured for being removed from the tool.

* * * * *